(12) United States Patent
Roose

(10) Patent No.: US 11,839,932 B2
(45) Date of Patent: Dec. 12, 2023

(54) CUTTING DEVICE AND METHOD

(71) Applicant: Fit Things NV, Dendermonde (BE)

(72) Inventor: Rik Roose, Dendermonde (BE)

(73) Assignee: Fit Things NV, Dendermonde (BE)

( * ) Notice: Subject to any disclaimer, the term of this patent is extended or adjusted under 35 U.S.C. 154(b) by 103 days.

(21) Appl. No.: 16/080,192

(22) PCT Filed: Dec. 9, 2016

(86) PCT No.: PCT/IB2016/057492
§ 371 (c)(1),
(2) Date: Aug. 27, 2018

(87) PCT Pub. No.: WO2017/153825
PCT Pub. Date: Sep. 14, 2017

(65) Prior Publication Data
US 2019/0054564 A1    Feb. 21, 2019

(30) Foreign Application Priority Data
Mar. 9, 2016 (BE) .................................. 2016/5172

(51) Int. Cl.
*B23K 26/08* (2014.01)
*B23K 26/38* (2014.01)
(Continued)

(52) U.S. Cl.
CPC ........ *B23K 26/083* (2013.01); *B23K 26/0869* (2013.01); *B23K 26/38* (2013.01); *B23K 2103/40* (2018.08); *B31B 50/20* (2017.08)

(58) Field of Classification Search
CPC .............. B23K 2103/40; B23K 26/083; B23K 26/0869; B23K 26/38; B31B 50/20
(Continued)

(56) References Cited

U.S. PATENT DOCUMENTS 4,346,284 A * 8/1982 Grollimund ......... B23K 26/067
                                                            219/121.67
4,434,969 A * 3/1984 Von Ruden ........... E21B 19/086
                                                               254/29 R (Continued)

FOREIGN PATENT DOCUMENTS

CN    101827681 A    9/2010
DE    10328868 A1    1/2005
(Continued)

OTHER PUBLICATIONS

Translation DE 10328868 (Year: 2020).*
(Continued)

*Primary Examiner* — Nathaniel E Wiehe
*Assistant Examiner* — Frederick F Calvetti
(74) *Attorney, Agent, or Firm* — WORKMAN NYDEGGER

(57) ABSTRACT

The present invention relates to an improved cutting device and an improved cutting method, specifically For processing and cutting sheets of a stiff material, such as cardboard and others, in which the sheets are supplied and moved In a stable way along a first direction, and a laser cutting unit (or at least the resulting laser beams) is moved along a second, substantially perpendicular direction, in which by coordinating the two movements, a desired cut is executed in the sheets.

21 Claims, 9 Drawing Sheets

(51) Int. Cl.
*B31B 50/20* (2017.01)
*B23K 103/00* (2006.01)

(58) Field of Classification Search
USPC .............. 219/121.67; 83/374; 226/167
See application file for complete search history.

(56) References Cited

U.S. PATENT DOCUMENTS

| | | | | |
|---|---|---|---|---|
| 4,577,791 | A * | 3/1986 | Leinhaas | B21D 43/11 226/150 |
| 4,645,900 | A * | 2/1987 | Heyden | B23K 26/067 219/121.67 |
| 5,201,258 | A * | 4/1993 | Cremona | B23D 47/025 144/245.1 |
| 5,436,423 | A * | 7/1995 | Welty | B26F 1/3813 219/121.39 |
| 6,191,382 | B1 * | 2/2001 | Damikolas | B23K 26/04 219/121.62 |
| 6,991,695 | B2 * | 1/2006 | Tait | G02B 5/287 156/268 |
| 7,045,740 | B2 * | 5/2006 | Leibinger | B23K 26/0884 219/121.82 |
| 7,764,432 | B2 * | 7/2010 | Miyajima | G02B 19/0014 359/636 |
| 8,253,064 | B2 * | 8/2012 | Beck | B23K 26/0876 219/121.67 |
| 8,328,706 | B2 * | 12/2012 | Gombert | B23K 26/0648 493/53 |
| 8,471,175 | B2 * | 6/2013 | Finn | B23K 26/0838 219/121.67 |
| 8,524,536 | B2 * | 9/2013 | Nakai | B65H 35/00 438/113 |
| 8,841,578 | B2 * | 9/2014 | Finn | B23K 26/0838 219/121.67 |
| 8,850,938 | B2 * | 10/2014 | Lindee | B26D 7/225 409/134 |
| 9,029,731 | B2 * | 5/2015 | Osako | B23K 26/0846 219/121.85 |
| 9,346,129 | B2 * | 5/2016 | Buschulte | B23K 26/38 |
| 9,492,984 | B2 * | 11/2016 | Ben-David | B31B 1/74 |
| 10,427,248 | B2 * | 10/2019 | Buschulte | B23K 26/38 |
| 10,512,965 | B2 * | 12/2019 | Prokop | B21D 45/003 |
| 2003/0208988 | A1 * | 11/2003 | Buckley | B65B 61/02 53/411 |
| 2004/0182830 | A1 * | 9/2004 | Hesterman | B26D 7/32 219/121.6 |
| 2005/0116396 | A1 * | 6/2005 | LeMasson | B23K 26/702 266/65 |
| 2007/0199648 | A1 * | 8/2007 | Hulverscheidt | B26F 1/3813 156/578 |
| 2008/0179304 | A1 * | 7/2008 | Osako | B23K 26/38 219/121.85 |
| 2009/0264270 | A1 * | 10/2009 | Hulverscheidt | B26D 5/26 493/342 |
| 2010/0132526 | A1 * | 6/2010 | Wahl | B23K 37/0461 83/438 |
| 2011/0203430 | A1 | 8/2011 | Nakai et al. | |
| 2013/0126489 | A1 * | 5/2013 | Buschulte | B23K 26/38 219/121.67 |
| 2013/0292226 | A1 * | 11/2013 | Ben-David | B65G 15/58 198/345.1 |
| 2013/0299492 | A1 * | 11/2013 | Miller | B65D 25/00 220/62 |
| 2013/0335467 | A1 * | 12/2013 | Gerber | B41J 11/20 347/8 |
| 2014/0103019 | A1 * | 4/2014 | Galvagnini | B23K 26/702 219/121.85 |
| 2014/0271328 | A1 * | 9/2014 | Burris | B23K 26/083 419/53 |
| 2015/0055085 | A1 * | 2/2015 | Fonte | H04N 5/23219 351/178 |
| 2015/0148940 | A1 * | 5/2015 | Ben-David | B31B 1/74 700/218 |
| 2016/0332261 | A1 * | 11/2016 | Buschulte | B23K 26/38 |
| 2017/0066033 | A1 * | 3/2017 | Prokop | B21D 45/02 |
| 2018/0001421 | A1 * | 1/2018 | Ottnad | B23K 26/0853 |
| 2019/0143456 | A1 * | 5/2019 | Vandevelde | B23K 26/38 219/121.67 |
| 2019/0337091 | A1 | 11/2019 | Culp | |
| 2020/0009848 | A1 * | 1/2020 | Meckelein | B32B 38/1875 |

FOREIGN PATENT DOCUMENTS

| | | |
|---|---|---|
| EP | 0224113 A1 | 6/1987 |
| JP | 04-127991 A | 4/1992 |
| JP | 08-066793 A | 3/1996 |
| JP | 2006-061926 A | 3/2006 |
| JP | 2011-156540 A | 8/2011 |
| KR | 10-2011-0068947 A | 6/2011 |
| KR | 10-2014-0066243 A | 5/2014 |
| WO | 2010/021025 A1 | 2/2010 |
| WO | 2017/153825 A1 | 9/2017 |

OTHER PUBLICATIONS

JP2011156540 (Year: 2021).*
JP2011156540 claims (Year: 2021).*
JP2011156540description (Year: 2021).*
JP2011156540 translation (Year: 2022).*
International Search Report and Written Opinion received for PCT Patent Application No. PCT/IB2016/057492, dated Apr. 21, 2017, 11 pages.

* cited by examiner

CUTTING DEVICE AND METHOD

CROSS-REFERENCE TO RELATED APPLICATIONS

This application is the U.S. National Phase of International Patent Application No. PCT/IB2016/057492 filed Dec. 9, 2016, which claims priority to Belgium Patent Application No. 2016/5172 filed Mar. 9, 2016, the disclosures of which are hereby incorporated by reference in their entireties.

TECHNICAL DOMAIN

The invention relates to an improved laser cutting machine for processing sheets of a stiff material, amongst other things (corrugated) cardboard and/or others. The invention further relates to an improved method for cutting sheets of a stiff material, amongst other things corrugated cardboard and/or others. Specifically, the invention relates to a device and method for producing packings or enveloping products, more specifically so-called secondary or tertiary packings.

STATE OF THE ART

Historically, the industry and services offer ever more possibilities for (home) delivery of packages and parcels. To this end, predetermined formats of parcels often have to be used, as it is not possible to handle parcel of a large number of formats in every location where parcels are being made and/or sent (for example post offices). Hence, mostly only a limited number of formats are present and they thus take much more space than is necessary according to what is in the parcel. The applicant notices in this respect that in many commercial situations, about 40% of the cargo space of the parcel delivery vehicles is not used usefully, which is from an economic point of view certainly not desirable, as well as in terms of efficiency (possible delays and related costs, more rides necessary for delivering the packages, higher costs for larger packages than is strictly necessary, . . . ). Hence, a solution to this problem is to offer a larger number of package formats. This can on the one hand be a huge investment without being sure that these formats will all actually be used, and in practice, in most situations, still a choice will have to be made for a (maybe somewhat larger) basic offer of formats. A more practical solution thus seems to allow in situ custom-made creating of a desired package format. This, as a consequence, requires the presence of a cutting machine that can be programmed to cut a large spectrum of forms from sheets of stiff material such as cardboard or other materials.

An example of a known system has been described in U.S. Pat. No. 7,045,740, in which a laser cutting system is described with a transport path suitable for transporting materials along a transport direction in the two directions of the transport direction, and a laser cutting unit capable of processing material on the conveyor belt. However, the invention has a number of shortcomings, such as safety, practical applicability, the suitable providing of the materials to cut at the laser cutting unit and others.

A second example of a known system has been described in EP 0,224,113. However, this document describes a more industrial application and can in no way be installed in a public room. Moreover, the invention of the document is focussed on the cutting of composite material and such device is in no way be intended for installation in an office or public room.

A third example according to US 2015/148940 describes a high-speed device for processing cardboard with laser beams, in which two or more laser beams are used to process cardboard that is moved with a constant speed over a conveyor belt, and in which each laser beam is directed to a particular working zone. In this respect, it should be noted that this relates to a system for heavy industrial applications, in enormous editions, and that said device is completely immobile, because of practical issues as well as related to safety and health (dust, smoke, . . . ), considering the energy consumption, the high power of the laser, the conveyor belt can only be used in a heavily industrial setting without extreme disadvantages. Moreover, this application will always require a sophisticated conveyor belt, typically with suction (vacuum) at the conveyor belt to hold the cardboard in position, considering the high speeds at which they are transported. Moreover, in this setting, it is crucial to work at a constant speed at which the sheets are moved, which in practice, imposes extremely high requirements to the laser cutting system (also very high speed and very high power) to be able to carry out the desired processing.

In US 2007/199648, a known system and method is also described for processing cardboard sheets with a laser cutting system, however, the optimization of the cutting is taken into account only in a limited way as again, an apparently generic conveyor belt is used.

Finally, the document DE 103 28 868 relates to a cutting device with another type of transporting system, namely rollers clamping the cardboard at both sides. The respective cutter is hereby however mechanical (rotary knife), which is the reason for the clamping transport, simply to hold the sheets during the processing with the knife system. The knife system of this document has also a number of other disadvantages, namely very high wear, longer processing times, impure processing (the sheets can be damages at the borders) and others.

A problem with many of these and other known systems is that these are expansive and large apparatus, that also often have only limited applicability (they can handle only a number of formats). As it can be desired to provide such a system at a large number of locations, for example post offices, an economically feasible alternative must therefore be provided that more can be placed in reliable (public health, safety and others) way in such public location. Known systems in which sheets of cardboard are placed on a laser cutting blade, after which one or more lasers process the sheets according to a set or inputted instruction, however fail, as these are both large and expensive, and more suitable for industrial settings, in which more stringent safety conditions are already imposed that are difficult to implement in a practical way in every public room (post office).

A second aspect in which the known systems fail, is flexibility to cope with different materials. Some sheets are thicker, thinner or have local irregularities (corrugated cardboard) causing another cutting effect. Because it is important to limit the energy consumption of the laser, it is crucial to ensure that the sheets are cut by the laser beams in a focal point (thus in which the sheet to cut is placed approximately on the focal point of the laser beam). As it relates to compact systems, a small variation in distance to the laser source cause a big change in transferred power to the sheet, as a result of which the laser possibly cuts a sheet where it should only have weakened the sheet, and thus to etch away only a layer, and vice versa.

An above-mentioned problem is the installation of these systems in public rooms in a way in which the health of the persons that are present or other uses is not jeopardized. The use of laser cutting machines causes on the one hand undesired (noxious) gases, but also smoke, dust (certainly when processing cardboard, specifically corrugated cardboard). This situation should thus be avoided in busy rooms, where workers must for example spend all day. A solution to this problem can be to install the laser cutting machine in a separate ventilated room, but this is often difficult because of a lack of space, certainly in urban areas where it is difficult to scarify office space for a technical room.

The present invention aims to find a solution for at least some of the above-mentioned problems.

There is a need for an improved cutting device and cutting method that is both compact and that can be used in a safe way in (office) working environments or public rooms, and this preferably without excessive additional costs.

SUMMARY OF THE INVENTION

The invention relates in a first aspect to an improved device for cutting sheets of a stiff material, such as cardboard, specifically corrugated cardboard, and similar. This device comprises the following parts:
  a. a transporting system for the controlled movement of the sheets along a transport direction from an input to an output, in which the sheets, lie in a transport plane that is parallel to the transport direction, preferably in which the transporting system is adapted to move the sheets in a controlled way in both senses of the transport direction;
  b. a cutting system for processing the sheets, in which the cutting system comprises one or more lasers for producing one or more laser beams and comprises one or more optical system for controlling one or more of the laser beams so that at least a part of the one or more of the laser beams cuts the transport plane along a beam direction, in which at least one of the optical system is adapted to move the one or more laser beams that cuts the transport plane, along a cutting direction, in which the cutting direction lies in an plane perpendicular to the transporting direction and parallel to the transport plane;
in which the transporting system is adapted for grip the sheets during the movement at at least two grip points or grip zones, preferably at 4 or more grip points or grip zones, by clamping them, so that there is a minimal variation on the sheets in position of the sheets with respect to the cutting system along the beam direction, in which the beam direction is preferably substantially perpendicular to the transport plane.

A first advantage of the above-mentioned device is that it can be produced in a very compact way, as the laser (or the optical system) should only be able to move in one dimension, which moreover can be carried out in a much simple way, contrary to components that move in two dimensions. However, because the sheets are guided and moved along a second dimension with respect to the dimension in which the laser (or the optical system) moves, it is no longer necessary to have the laser (or the optical system) move in two dimensions in order to have the whole surface of the sheet (or other material) processed. In this way, it is possible to install the device in a limited space as operations are carried out effectively only on a very limited strip, and the sheets can move to and fro. As the cutting parts of the laser beams can only be moved in one direction and thus lie in one plane, it is simple to provide a transporting system with an opening at both sides of the transporting plane in these positions, so the laser beams can freely cut.

Contrary to many systems from the state of the art, the invention uses a laser for cutting. This reduces on the one hand the dust that is released as well as the waste, considering the laser processes, and actually destroys, a very limited area, while adjacent parts experience very little effect, contrary to mechanical cutting systems, in which knifes and saws (or other cutting parts) are responsible for cutting and cause much tension and/or stress for the adjacent pats of the zones to process. This not only produce waste and dust, but also causes the product to be more rough from an, aesthetic point of view, in which the product can also be further weakened by small (micro) cracks by the tensions that are caused, that, in case of further cause, can enlarge and cause the product to fall. Moreover, the use of a laser also allows for more subtle operations, such as cutting out or fitting in a very subtle pattern, and central openings can be made easily in the sheets, which is much more difficult in most alternative cutting systems. The laser can for example be a $CO_2$ laser (preferably in an aluminium casing, in which it can also apply to other types of lasers), but it is certainly not limited thereto. Other possibilities are for example so-called Nd:YAG lasers or fibre lasers. The used laser preferably has a minimum power of 40 Watt, more preferably of 50 Watt, 55 Watt, 60 Watt, 65 Watt, such as 75 Watt, 85 Watt, 100 Watt or higher. Note that the power of the laser is however preferably maximum 120 Watt, and minimum 40 Watt. If necessary, the lasers will be provided with a cooling, such as fluid cooling such as water cooling. Preferably, a protection cap is also provided for the device, in particular to protect the lasers, more preferably such that, when opening the protection cap and/or exposing the lasers, the device is automatically stopped. Preferably, the moving components of the cutting system are driven by a stepping motor.

Note in the above description, it is possible to provide the laser(s)—in practice, a laser head—independently moving along the cutting direction (in which the optical systems, for example for focusing, in practice then move along with the laser(s)—laser head). The components for this movement are illustrated in FIGS. 3 and 4, although there are other options. In FIG. 3 and FIG. 4, a suction cap is clearly shown around the laser head.

As said, the transporting system is adapted for clamping the sheets when moving them. The ensures on the one hand an exact positioning of the sheets in the transporting plane so that the desired operations can be carried out with the laser(s) as instructed, and this with a very high precision. Clamping is further also intended for avoiding or at least minimizing deviations of the sheets in the beam direction (or in a direction perpendicular to the transporting plane). As such, it is for example guaranteed that the sheet is stretched and that there are no local bulges, folds or other undesired situations. In a laser cutting system, the distance from the sheet to the laser can also be an important factor, certainly if it is sometimes desired not to cut the sheet completely, but only to weaken or etch it. It will be desired to keep the distance of the laser beam to the sheet substantially constant so that no corrections have to be carried out as to the intensity of the laser beams (power adjustments).

A further advantage of the said device is that the speed at which the transporting system moves the sheets, can be easily adapted, and typically is also strongly variable during the processing process, as it is desired to carry out the necessary operations on one and the same line. In many available installations however, work is carried out at particularly high speeds that cannot or hardly be adapted, and therefore, laser systems are chosen with a much higher power, making the complete device large, clumsy and immobile (not only because such cutting systems are themselves more voluminous and heavy, but also because they cause very much additional problems owing to safety considerations). However, in the invention of the present document, a compact, and even mobile, device is provided, by deliberately choosing for a less voluminous device that is oriented much more towards office environments, or even mobile devices that can for example be taken along in a van. In a preferred embodiment, the system can even be carried by one person, and comprises a collapsible sheet (preferably at both sides) for supporting the sheets when introducing sheets and/or discharging the processed sheets.

Preferably, the transporting system is configured so that the moving gripping elements (or rollers) at the opposite side of the transport plane with respect to the laser are configured in such way that they allow a different mutual deviation with respect to the transport plane, to optimally compensate for a varying thickness. In this way, two or more of the gripping elements (rollers) are be connected pivotally to each other to ensuring the gripping of the sheets by clamping them. Moreover, in case of a higher number of such gripping elements at the side, cross-connections can also be made. A more detailed example can be found in the figures.

Moreover, it should also be taken into account that a protection element can be included at the opposite side of the sheets with respect to the cutting system, to catch laser beams that penetrate through the sheets, and thus to avoid damage to the device. A possibility in this respect is providing a hollow, dark, preferably black cylinder (partly shown in FIGS. 5 and 7) with one or more openings in the casing, typically applied at the sides (at incidence of the laser beams from below or above and from a perspective along the longitudinal axis of the cylinder). This cylinder is positioned to catch penetrating laser beams (propagating past the transport plane) and substantially absorb, and partially diffuse them. The openings in the casing are made to further improve ventilation to avoid development of heat. More preferably, ventilation (suction and/or blower) can be provided to neutralize the heating of the cylinder, as well as to remove smoke and/or other pollution. As an alternative, a hollow cylinder can also be provided with therein an opening for incidence of the laser beams, in which inside at the opposite side with respect to the opening, there is a flat protrusion under a non-perpendicular corner with respect to an incident beam in order to reflect this back.

In a possible embodiment, the cutting system can, additionally or alternatively, be adapted to direct the one or more laser beams (separately) also under a non-perpendicular position with respect to the transport plane over which the sheet is moving. This corner can preferably be adapted dynamically during the working of the device (thus during the processing/etching/cutting of the sheets). The deviation with respect to the perpendicular incidence of the laser beams is preferably maximum 20°, more preferably maximum 15° and mostly preferably maximum 12°, to guarantee a beautiful product and also not to unnecessarily extend the processing time (non-perpendicular angle of incidence causes a lower power per surface entity). Note that the direction in which the deviation of the perpendicular incidence takes place, normally is alongside the transporting direction (in other words, in which the laser beams substantially lie in a plane parallel to a perpendicular line to the transport plane and parallel to the transport direction). In still more preferred embodiments, the deviation is maximum 11°, 10°, 9°, 8°, 7°, 6°, 5°, 4°, 30, 2°, 1° or even 0°.

In a preferred embodiment, the cutting system is positioned under the transport plane. Note that here (and also further in the text), the embodiment is described from the operational situation. In other words, the cutting system cuts from below into the sheets, in which the transporting system is installed substantially above the cutting system. Here, the transport system comprises a first set (of at least one, but preferably at least two—namely at both sides of the cutting zone both above and under the plane—or evens four or more) gripping elements and a second set (of at least one, but preferably at least two, or evens four or more) gripping elements to grip the sheets in a combined way at the grip points or grip zones. Here, the first set of gripping elements is positioned in the half-space separated by the transport plane where the cutting system is substantially located, and the second set of gripping elements in the other half-space. Note that these gripping elements are adapted to make the sheets movable, and preferably to guide this movement by themselves, along the transport direction and in this respect even substantially keep them stationary as to the position in the transport plane. The first set of gripping elements is hereby adapted to further also keep a substantially stationary position during cutting, to guarantee in this way that the cutting system cuts the sheets so that the focal point (or the focal zone) of the laser beams substantially overlaps with the sheets. Hereby, it should indeed be taken into account that even in sophisticated laser systems, the laser beam remains parallel only over a limited focal zone, and that they will nevertheless diverge. Because it is desired that the laser beams cut the sheet in the short area where the laser beams are focussed optimally, it is thus very important that the sheets are delivered at the correct position (thus without or with minimum variations in the direction perpendicular to the transport plane). In other words, by providing the first set of rollers stationary with respect to the cutting system, it is guaranteed that this focal zone corresponds to where the zones to cut (or more generally, to process) of the sheets are located. In this respect, it should be noted that this takes place in a passive way, the first set of gripping elements is indeed typically placed simply stationary, contrary to the active guidance for the positioning thereof in many other systems.

Hereby, the second set of gripping elements positioned such that they can be moved along the direction perpendicular to the transport plane. In this way, sheets with varying thickness can be gripped easily and the distance to the laser can be kept constant with a view to the overlapping of the focal zone of the laser beams with the sheets. Another advantage is that the gripping becomes easier as the gravity that affects the second set of gripping elements, already automatically ensures a certain degree of clamping. Again, this allow to ensure the clamping and gripping of the sheets by means of a substantially passive configuration. Additionally, also active actuators can be provided to optimize the gripping, in other words to ensure the clamping without damaging the sheets. In a possible embodiment, the gripping elements of the first and the second set are connected to each other (typically one to one), and are adapted to actuate on the sheets to propagate them along the transport direction. In this way, the gripping elements can be controlled by guiding them, or via a mechanical connection connected to offer one and the same effect (for example in the case of one or more rollers as gripping elements at both sides, connecting them to impose a same rotation speed).

The above description does however not mean that an opposite configuration also belongs to the possibilities, namely with the cutting system 'above' the transport plane, in which the first set of gripping elements is also located above the transport plane, and are also stationary for guaranteeing an optimal processing of the sheets, by moving these in the focal zone of the laser beams along the transport plane.

In a possible embodiment, the system comprises two separate movable lasers (specifically actually laser beam generating component) for producing two separate laser beams, with accompanying optical system. Note that this can be achieved by providing two separate laser heads as a laser beam generating component, each suitable for providing a laser beam, but both actually operative on the same laser device. In this way, the processing speed can possibly be doubled. Thereby, it can further be possible to change the orientation of the lasers and/or the optical systems, so that the laser beams fall on the transport plane in a non-perpendicular angle, and the sheets can be completely processed.

In a further embodiment hereof, the two lasers and/or the optical systems controlling the laser beams along two mutual substantially parallel, but separate axes are moves, separately from each other so that the lasers and/or the optical systems can move along each other over the cutting direction (in both senses), both preferably lying in the same plane parallel to the transport plane.

The optical system of the invention can comprise a number of elements. Preferably, it comprises however a lens for the laser beam (laser beams) so that they have a focal zone (zone with minimum diameter of the beam—beam waist, or at least a surrounding zone in which the diameter of the beam remains limited, for example over so-called Rayleigh length at both sides of the beam waist) at the height where the beam (beams) cut the sheet in the thickness dimension, or at least so that the cross-section of the sheet substantially coincides with this focal zone. This is a further aspect indicating the importance of a very precise positioning of the sheets with respect to the laser, as this is preferably positioned in such way that it cannot or can only move along the cutting direction (and is thus stationary as to the distance with respect to the desired transport plane). In a typical embodiment, the distance between the laser and the sheets (the transport plane) is between 2.0 cm and 10.0 cm, preferably between about 3.0 cm and 8.0 cm. Possible examples of the upper and lower limits of this distance are for example 78 mm, 76 mm, 74 mm, 72 mm, 70 mm, 68 mm, 66 mm, 64 mm, 62 mm, 60 mm, 58 mm, 56 mm, 54 mm, 52 mm, 50 mm, 48 mm, 46 mm, 44 mm, 42 mm, 40 mm, 38 mm, 36 mm, 34 mm, 32 mm.

Note that said distances between laser and sheets actually refer to the distance between the sheets and the lens that is part of the optical system, and not necessarily the casing or other parts of the laser.

By guaranteeing to a high degree of certainty that the focal zone of the laser beams falls in the thickness of the sheets, an efficient processing of the sheets is ensured, in which the power is maximally used (at a surface that is as small as possible). Moreover, this also ensures a better finishing, as there will be less scorched fringes as a result of low-energy development of the laser beam.

A suitable choice of the lens can moreover be used to meet the specific application. In this way, a more spherical lens, with typically shorter focal zone, can be used for etching operations (as a maximum power of the laser beam per surface unit is only necessary or even desired there over a limited depth), while a less spherical lens, with typically a longer focal zone, can be used for cutting. In a preferred embodiment, parts (for example lenses) of the optical system can whether or not automatically be changes depending on the application.

In a preferred embodiment, the transport system is suitable for gripping the sheets by clamping them at both sides of the transport plane in the grip points or the grip zones in which the grip points or the grip zones at the side where the one or more lasers are located, are positioned at a fixed distance with respect to the axis over which the optical systems move.

In a further preferred embodiment, the transport system comprises at least two gripping elements at both sides of the transport plane in the grip points or the grip zones and for moving the sheets in a controlled way along the transport direction, and in which the gripping elements at a first side of the transport plane where the one or more lasers are located, are positioned at a fixed distance with respect to the axis over which the optical systems move, preferably in which the gripping elements at the second side of the transport plane are positioned movably to grip the sheets by clamping them.

In a further embodiment, the device comprises a suction system for suction of impurities such as dust and/or smoke. The suction system is hereby positioned in such way that the suction system is located closer to the transport system than the one or more lasers. In a preferred embodiment, the suction system comprises a pipe or tube, in which the pipe or tube has an output at the outer side of the device, for removing dust from the device and for avoiding possible technical problems, as well as for security reasons (danger of fire). The suction system preferably comprises at least one cap and one or more filters. A possible filter hereby is a carbon filter (active carbon filter). In a preferred embodiment, the suction system is provided close to the position in which is cut into the sheets to remove the generated dust and/or smoke as soon as possible. Often, such suction system is part of a laser cutting system and in this way automatically directed close to or to the desired place.

By providing a suction system, undesired development of gases and/or dust can be removed immediately, instead of being released with possible noxious effects for humans, animals or the environment (pollution, stains or similar). As said, this air pollution (as well as the normal pollution) in an office environment or public room should certainly be avoided as workers possible have to be present in unhealthy conditions for a long time without any facilities that are present (or desired, as the idea is not to have post officer sitting at a counter with a gas or dust mask or safety goggles). In industrial settings, there is more flexibility in this respect, as the rooms are larger, and there are already other safety regulations, or there are more stringent general requirements as to ventilation and others, however the invention relates to a system that can be placed everywhere. Because the cutting system can only be moved in a limited way along one axis (cutting direction), it is possible to bring a suction system or suction cap very close to the sheets (the transport plane) without obstructing the operation. In this way, all impurities can be sucked away in a very efficient way. Preferably, air is blown to the optical systems (at least parts thereof) of the device in order to keep the optical systems, that guide the laser light, substantially dust-free, as tracks of fire could occur there if dust parts remain there. Additionally (or alternatively), air is also blown to a zone close to the focal point of the laser (the point where is effectively cut), ensuring, combined with the suction system, an optimal ventilation and suction.

In a further embodiment, the transport system comprises a roller system. The roller system comprises a first set of rollers and a second set of rollers, in which the first set of rollers and the second set of rollers is placed and adapted in such way that they can grip the sheets that are moved along the transport system, between the first set of rollers and the second set of rollers, and in this way can move the clamped sheets along the transport direction, preferably in both senses of the transport direction. Preferably, the first and the second set of rollers is adapted in such way that each roller of the first set is adjusted to grip an object by clamping it with a roller of the second set (or vice versa, each roller of the second set is adjusted to grip an object by clamping it with a roller of the first set). More preferably, the rollers are provided with a wear-resistant coating or envelope that has a grip on materials such as cardboard (corrugated or other).

Using rollers to clamp and move the sheets along the transport direction, allows to carry out this simply and in both senses of the transport direction, with a high accuracy. The rollers can for example be driven by one or more stepping motors for very accurate positioning and movement of the sheets. This gripping by means of clamping can for example be carried out by one or both sets of rollers with a spring (such as e.g. a gas spring or other), so that the rollers can grip objects with varying thickness by clamping them. Alternatively, one or more rollers of one or both sets can comprise an elastic (compressible) material that adjusts in this way to the thickness and/or form of the object between the rollers. Alternatively, a band or a similar object can also be stretched over a number of rollers to extend in this way over a larger surface of the object between the rollers.

Possible thicknesses of the sheets that can be processed with the method are preferably between 0.1 mm and 2.5 mm, typically between 0.3 and 1.5 mm, or for example with 0.4 mm, 0.5 mm, 0.6 mm, 0.7 mm, 0.8 mm, 0.9 mm, 1.0 mm, 1.1 mm, 1.2 mm, 1.3 mm, 1.4 mm as an upper or lower limit. Higher or lower thickness are however also possible.

Alternatively, the transport system can comprise a number of robot arms for moving the sheets, and it can also use other methods.

In a further embodiment, the device comprises a control system for operating the transport system and for operating the cutting system. By means of a precise coordination of the two systems, it is possible to make the cuts in a compact room by means of the device of the invention. Preferably, the control system is adapted to divide the tasks over a number of sheets by means of one or more instructions for one or more cutting forms onto the sheets, so that, based on the length and width (possibly also the thickness) of the sheets, an optimal use can be made of the sheets. This avoids unnecessary waste if inefficient use is made of the available materials and avoids wasting by using too much of the sheets for instructions that can be carried out on less sheets. Preferably, the control system chooses, based on the one or more instructions, out of a number of sheets with more known formats.

In a further embodiment, at least one of the optical systems comprises one or more mirrors, in which the mirrors are suitable for manipulating one or more of the laser beams in which the one or more laser beams are defected at least partially so that the deflected laser beams intersect the transport plane along the beam direction. The optical systems can also be provided with a radiation divider to form several laser beams from one laser beam and thus for making several cuts. The split laser beams can then be controlled separately (mirrors and other optical components). Preferably, the one or more lasers are mounted stationary and it are the optical systems that are mounted movably, in order to move the produced laser beams along the cutting direction.

In a still further embodiment, one or more of the mirrors are mounted movably along the cutting direction with respect to the transport system so that the one or more deflected laser beams can be moved along the cutting direction, and in which the deflected laser beams cannot substantially change direction. The advantage is that the transport system and the cutting system can be tuned to each other easily to make a cutting pattern, as they can both move only along a separate axis or direction. In this way, the movements of both systems can be coordinated more easily. Alternatively, the deflected laser beams can change direction so that the changed direction is parallel to a plane extending through the cutting direction and a perpendicular line on the transport plane. Preferably, the laser beams can in this case only more direction in a plane extending through the cutting direction and a perpendicular line on the transport plane.

Preferably, the laser (to consider as the laser head) and the optical system are integrated into each other, and both move along the cutting direction over an axis. This also ensures a correct focusing of the produced laser beams at the sheets.

In a further embodiment, the cutting system and the transport system are adjusted to each other so that the processing of the sheets according to a predefined design is carried out by moving the sheets along the transport direction and moving the part of the one or more laser beams that intersect the transport plane, along the cutting direction. Preferably, moving of the part of the one or more laser beams cat intersect the transport plane is actuated by moving the one or more parts of the one or more optical systems along the cutting direction, more preferably so that the lasers (laser sources) remain stationary. As the lasers (or laser sources) are fragile and expensive, it is preferred to mount them stationary and to move only the optical systems that manipulate (focus, deflect, split, reflect and similar, whether or not completely) the produced laser beams so as to adjust the path of the laser beams.

In a further embodiment, the first set of rollers comprises at least two groups of rollers. The at least two groups of rollers of the first set are separated from each other along the transport direction so that the part of the one or more laser beams that cuts the transport plane, can be moved along the cutting direction between the separated groups of rollers of the first set. Hereby the first set of rollers is mounted at the side of the transport plane where the lasers are mounted.

In an alternative embodiment, the second set of rollers comprises at least two groups of rollers. The at least two groups of rollers of the second set are separated from each other along the transport direction so that the part of the one or more laser beams that cuts the transport plane, can be moved along the cutting direction between the separated groups of rollers of the second set. The second set of rollers is mounted at the opposite side of the side of the transport plane where the lasers are mounted.

In a preferred embodiment, the first set of rollers comprises at least two groups of rollers and the second set of rollers comprises at least two groups of rollers. The at least two groups of rollers of the first set are separated from each other along the transport direction so that the part of the one or more laser beams that cuts the transport plane, can be moved along the cutting direction between the separated groups of rollers of the first set. The at least two groups of rollers of the second set are separated from each other along the transport direction so that the part of the one or more laser beams that cuts the transport plane, can be moved along the cutting direction between the separated groups of rollers of the second set.

An advantage of the above-mentioned embodiments is the possibility of carrying out the movements of the cutting system separately from the transport system, without any risk that the laser beams can touch parts of the transport system or can be blocked as a result thereof. Moreover, it is also possible to have a part of the cutting system (optical system or laser itself) approach the transport plane very closely without interacting with the transport system. In this way, optimal use is made of the laser by minimizing the path length.

In a further embodiment, the one or more lasers are adjusted so that the laser beams have an adjustable power and/or an adjustable working regime. It is for example possible to process sheets with varying, but known thickness or similar in a suitable way by adjusting the power depending on the thickness (or the kind of material) of the sheet. Furthermore, it can be desired to make complete cuts, but with weakenings, or with periodic cuts, so that the pattern to cut can be easily removed from the rest of the sheet (pressing out).

In a further embodiment, the device is adapted for being mounted so that the part of the one or more laser beams that cuts the transport plane, propagates from below to above, preferably in which gripping the sheets by clamping it is carried out under the influence of the gravity. In this way, the sheets can be clamped from above with several clamping elements, for example rollers, by simply making the above clamping elements move under the influence of the gravity, so that they grip the sheet automatically by clamping it. Because the laser beams come from below the sheet, they do not interact with the above clamping elements, as a result of which they can for example be made bigger to grip as much surface of the sheet as possible along the upper side.

In a further embodiment, the device is adapted for being mounted so that the transport plane is substantially perpendicular to a base onto which the device is placed during operation of the device. The configuration allows to occupy a limited surface and thus to use the device in locations with little available space, or to make a mobile version of the device.

In an alternative embodiment, the device is adapted for being mounted so that the transport plane is substantially parallel to a base onto which the device is placed during operation of the device. The advantage is amongst other things that the rollers (or other transport systems) can use the gravity to have more grip on the sheets. Moreover, this can allow a safer configuration, where there is a large (stable) supporting surface for the device. Moreover, it is possible to provide in this way for an easy supply and/or discharge system for delivering sheets and/or removing processed sheets.

In a further embodiment, the device is adapted for being mounted so that the transport plane and a base onto which the device is placed, are in an angle during operation. This angle can be between 0° and 90°, such as 10°, 20°, 30°, 40°, 50°, 60°, 70°, 80°.

In a further embodiment, the device comprises a supporting surface for at least partially supporting the sheets, preferably in which the supporting surface can be folded out at least at one side of the supporting surface, and more preferably in which the supporting surface can be folded out at the input and/or at the output of the device. In this way, it is easier to transport the device and the device can even be taken along to different locations without occupying too much space in a transporting means. Moreover, the presence of the supporting surface makes the device more user-friendly, such as possibilities to automatically staple finished sheets, or to place a supply of sheets for processing, that can preferably be taken automatically and be processed in the device.

In a further embodiment, the transport system comprises several balls for moving the sheets in such way that the sheets can be turned in the transport plane, preferably in which an air stream is provided for supporting the balls, more preferably in which the balls are air bearings. This extension can amongst other things be efficient to be able to cut curved forms in a fluent way. Moreover, the air bearings allow to carry large weights without friction causing much wear.

In a further embodiment, the transport plane separates into two half-spaces, in which the first set of rollers is located in the first half-space, and the second set of rollers is located in the second half-space. The first set of rollers is located between the transport surface and the one or more lasers. By extension, the second set of rollers is located such that the transport plane is located between the second set of rollers and the one or more lasers. Hereby, the first set of rollers is adapted so that the first set of rollers can be moved to and fro the second set of rollers. Alternatively, the second set of rollers is adapted so that the second set of rollers can be moved to and fro the first set of rollers. Alternatively, both the first set of rollers and the second set of rollers can moreover be move to and fro each other. This ensures on the one hand a better clamping, as well as the possibility to guarantee a good grip at varying profiles of the sheets. Possibilities to further develop these embodiments are for example proving the rollers of one or both sets with a suspension with one or more springs, as shown in the figures.

In another further embodiment, the second set of rollers is adapted such that the second set of rollers can be moved with respect to the cutting system along the beam direction, and in which the first set of rollers is mounted stationary with respect to the cutting system so that the second set of rollers can grip the sheets by clamping them against the stationary first set of rollers, and in which the cutting system processes the sheets from the first half-space, so that substantially the same distance along the beam direction can be maintained between the cutting system (and thus the one or more laser) and the clamped sheets. This configuration guarantees that the place where the sheets are effectively cut, is always at substantially the same distance. In this way, it can be ensured that the laser beam (or laser beams) has a focal point there to carry out the cutting with a minimum power of the laser. Moreover, it is in this respect not necessary to move the cutting system to maintain the same distance.

Oppositely, the first set of rollers can be moved along the beam direction with respect to the stationary second set of rollers. Hereby, the cutting system is preferably adapted to diverge together with the first set of rollers so that substantially the same distance can be maintained along the beam direction between the cutting system and the clamped sheets. In this way, it can be ensured that the laser beam (or laser beams) has a focal point there to carry out the cutting with a minimum power of the laser.

In a further embodiment, the device is provided with a light-emitting element, preferably extending longitudinally along (above and/or below, possibly partly inside the device and thus radiating to the outside) an opening of the device along which the sheets of cardboard can be introduced. A same light-emitting element can be provide at an opening along which the processed sheets are removed. This element does not only clearly indicate where the input and the output are located, and warns a user for problems such as obstructions, blockages, and similar others. The light-emitting element can moreover be controlled to indicate a degree of completion of an instruction or an operation (clearly by means of a percentage, or a bar or object that is filled as the completion is near, or a colour change, for example from red to green or blue). Preferably, the light-emitting elements are LED elements. Note that said embodiments can also be applied to the method described in this document.

In a further embodiment, the device comprises a positioning mechanism, suitable for receiving and guiding the sheets in a correct orientation. This positioning mechanism can amongst other things comprise one Or more blocking mechanisms that allows the introduction of the sheets only to a certain depth before the device processes one or more sheets, so when introducing the sheets, in which an correct orientation is preferably automatically given to the sheets (for example a straight barrier that can limit a side of the sheets correctly). The blocking mechanisms can for example collapse automatically once the processing of the sheets would have started. Alternatively or additionally, one or more sensors can also be provided (for example infrared) to monitor the correct positioning of the sheets.

In a second aspect, the invention relates to a method for cutting sheets of a stiff material, such as sheets of cardboard, specifically corrugated cardboard, or other, comprising the following steps:
  a. moving one or more sheets in a controlled way along a transport direction, in which the sheets lie in a transport plane that is substantially parallel to the transport direction;
  b. moving one or more controllable laser beams in a controlled way along a cutting direction, in which the one or more laser beams intersect the transport plane along the beam direction, in which the cutting direction is parallel to the transport plane, in which the one or more laser beams are suitable for processing the sheets, preferably for cutting the sheets, and in which preferably the cutting direction is substantially perpendicular to the transport direction;

Hereby, when moving the one or more laser beams, the one or more laser beams make one or more cuts of the one or more sheets on one point of the one or more sheets, in which the controlled movement of the one or more sheets is carried out such that the sheet undergo a minimum variation in position along a direction along the beam direction.

The advantages thereof have already been described in this document, one of which is that the focusing of the laser beams will always be carried out at the same distance and that in this way, the power of the laser must not or hardly be adjusted because of varying distances to the sheet as in known systems.

In a further embodiment, the one or more laser beams are generated and guided by one or more lasers and one or more optical systems, in which the lasers and/or the optical systems are mounted movably along the cutting direction, in which the one or more sheets are gripped by at least two gripping elements at both sides of the transport plane by clamping them during the controlled movement of the one or more sheets, in which the gripping elements at the side of the sheets where the laser beams fall onto, are positioned stationary with respect to an axis over which the optical systems can be moved.

In a further embodiment, at least two laser beams are used for cutting or processing the sheets, in which the laser beams are provided and moved separately along the cutting direction. On the one hand, the laser beams can be provided by two lasers (and optical system) that move along the cutting direction on the same axis (and hereby optionally have the laser beams fall onto in a particular angle), on the other hand, the lasers (and optical system) can move on two separate, parallel axes so as to cover a full length of the sheets.

In a further embodiment, the method comprises the following step; in which the following step is carried out essentially simultaneously with the execution of the one or more cuts:
the suction of impurities caused by the execution of the one or more cuts of the one or more sheets by the one or more laser beams.

In a further embodiment, the laser beams are processed by one or more optical systems so that the laser beams intersect the transport plane, in which the optical systems are mounted movably along the beam direction so that, when executing the cut, a constant, predetermined distance along the beam direction is maintained to a closest side of the one or more sheets. This has already been described in the document relating to the device, in which the method can be further completed in a logical way.

In a further embodiment, the method is carried out with a device as described in the present document, or according to combinations of different embodiments described in the present document, with the corresponding advantages.

DETAILED DESCRIPTION

Figure 1:
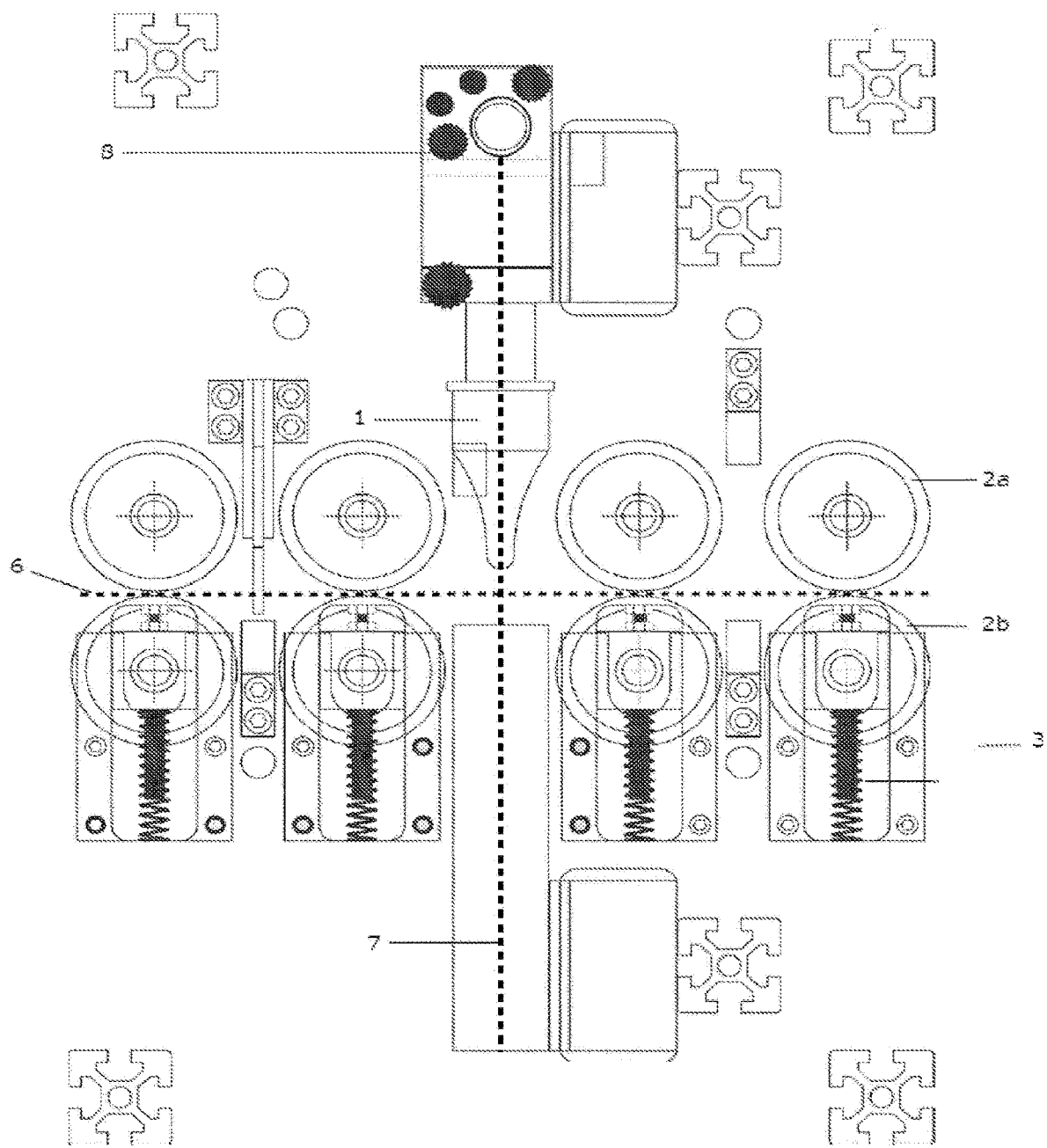
FIG. 1 shows a cross-section of the device for cutting sheets of a stiff material, perpendicular to the transport direction and along the transport plane.

Unless otherwise specified, all terms used in the description of the invention, including technical and scientific terms, shall have the meaning as they are generally understood by the worker in the technical field of the invention. For a better understanding of the description of the invention, the following terms are explained specifically.

"A", "an" and "the" refer in the document to both the singular and the plural form unless clearly understood differently in the context. "A segment" means for example one or more than one segment.

When "approximately" or "about" or "substantially equal/perpendicular/parallel/the same" are used in the document together with a measurable quantity, a parameter, a period or moment, etc., variations of +/−20% or less, preferably +/−10% or less, more preferably +/−5% or less, still more preferably +/−1% or less, and even still more preferably +/−0.1% or less than and of the cited value are meant, as far as such variations apply to the invention that is described. It will however be clearly understood that the value of the quantity at which the term "approximately" or "about" is used, is itself specified.

The terms "include", "including", "consist", "consisting", "provide with", "contain", "containing", "comprise", "comprising" are synonyms and are inclusive of open terms that Indicate the presence of what follows, and that do not exclude or prevent the presence of other components, characteristics, elements, members, steps, known from or described in the state of the art.

The term "transport direction" relates to the direction along which a sheet of a stiff material is moved by the transport system. Note in this respect that no sense of the movement is indicated.

The term "cutting direction" relates to a direction parallel to the transport plane along which cuts have been made in a sheet of stiff material on the transport system, and along which one or more parts of the cutting system move to produce the laser beam or laser beams for processing the sheets of stiff material. Preferably, this cutting direction is perpendicular to the transport direction. Note in this respect that no sense of the movement is indicated.

The term "beam direction" relates the direction of the path of the part of the laser beam cutting the transport plane and executing the processing of the sheets. Practically, the beam direction will often be substantially perpendicular to the transport plane, but it is not limited thereto.

When "laser" is used in a movable context in this document, it firstly refers to a beam head or other optical element that is suitable to generate the laser beams typically produced in a tube as an output laser beam. The tube in which the laser beams were originally produced, will typically rather be immobile with respect to the device, only the component (or components) generating the resulting output laser beam, will be mounted movably (as well as coupling elements). The respective laser head can in this sense also be considered as an optical element as said in the text.

This document is described from a concept in which said three directions are perpendicular to each other and thus form a three-dimensional coordinate system. It should however be noted that the directions are not necessarily perpendicular to each other, but that they can also be placed in an angle to each other (however not parallel).

The citation of numeric intervals by means of end points includes all integers, fractions and/or real numbers between the end points, including these end points.

In a further embodiment of the device according to the present document, the device comprises a loading system, for example an automatic inlay table, for automatically supplying sheets (or other materials) to the transport system in a correct way (so that the sheets can be supplied upright, or in a desired angle). This can for example comprise one or more robot arms.

In a further embodiment of the device, the device comprises an unloading system for unloading the processed sheets and/or a folding system for folding the processed sheets.

In a further embodiment, the device comprises a scanning system or another recognition system for recognizing parameters of sheets, for example size, type or kind of material. This can be carried out by means of a visual recognition on the sheets (for example bar code, QR code), or based on the effective analysis of the parameter to recognize.

In a further embodiment, the device comprises one or more sensors for analysing (the characteristics of) the sheets (or other materials). These sensors are capable of fulfilling at least one or more of the following functions: analysing the presence of sheets (or other materials) on the transporting system and more precisely at the zone where the laser beams intersect the transport plane (and the cuts are made), determining the thickness of present sheets (materials), determining the width (along the cutting direction at the cutting zone) of present sheets (materials), analysing the presence of sheets (materials) past the cutting zone of the laser beams, determining the location of the part of the laser or the optical system that can be shifted along the cutting direction (also for calibration of the cutting system and protection against overloading by impossible movements), determining if an emergency stop is necessary (for example opening of the protection cap, overloading and other), determining if sheets (materials) slip on the transporting system (do not move or move insufficiently when the transporting system tries to actuate the movement, for example because of a blockage, clamping or other). Preferably, no sensor touches the sheets (materials) to avoid wear.

In a further embodiment, the device is suitable for being operated via a wireless and/or wired network (amongst other things to receive and carry out more instructions, whether or not after authorization of a user). This can also be achieved by a direct coupling of the user apparatus with the device (for example a docking station for smart phone, tablet or other connection, such as USB, with PC or laptop or other). Preferably, the control system is such that a user can give in instructions and configure creations for processing the sheets directly on the device, preferably via a screen (optionally a touch screen) or via a whether or not built-in mini-computer.

In a further embodiment, the device can be suitable for making an outer box and/or an inner box via a simple choice by means of one set of dimensions. In this way, based on the set of dimensions, a first box can be made, and subsequently, a choice can for example be made for creating a suitable outer box and/or inner box, optionally in which a play can be set for the outer box/inner box.

In a further embodiment, the device is adapted for evaluating if a sheet has the necessary dimensions to carry out an instruction. In other words, for example if the sheet is in the right material, is long, wide and/or thick enough to be able to execute the cutting pattern. Preferably, the device is adapted to warn the user or to indicate on the device that a wrong sheet according to the above conditions has been taken and/or to take another sheet and to evaluate if this other sheet satisfies.

In a further embodiment, the device is mobile, preferably, the device comprises a support or chassis with wheels (2, 3, 4 or more) and a possibility to clamp the wheels, preferably such that the clamping can be carried out in one single action.

In a further embodiment, the device comprises a web cam or similar visual captation system to enable remote monitoring.

In a further aspect, the invention relates to a method for controlling a device for cutting sheets of a stiff material, such as cardboard or any other material via a (mobile) application, preferably, the device is a device as described in this document. Hereby, the (mobile) application is intended for coupling (whether via a wireless network or directly) with the device to give an instruction to process one or more sheets. In the (mobile) application, a user can make his own creations or upload already existing creations (for example downloading creations of other uses). For making own creations, the dimensions of the creation can be set, as well as preferred material (thickness, type, dimensions, colour and other), adjustable geometric figures or forms can be used (or drawn freely), material choices can be made, number of copies and other.

In a possible embodiment, the (mobile) application sends the data for the instruction (and amongst other things the above choices) to the device, in which the instruction can be carried out. It can also be possible to save the creations locally (on the apparatus with the (mobile) application) or on the device.

Preferably, the (mobile) application is adapted so that one can search for devices that are set up as available: Vice versa; the devices are preferably adapted so that they can be offered in a wired and/or wireless network for use by consumers by means of the application. In the application, one can subsequently choose from the list of available devices and an instruction can be given that figures in a queuing list, shown on the apparatus where the application is run. More preferably, the user can also see which sheets are available (dimensions, material, colour and/or other).

In a possible embodiment, the device is provided with settings in which one or more main users can log into the device (via mobile application, directly on the device, via a mini computer, laptop, tablet, pc or other) and get access to a large number of settings, for example whether or not making the respective device available, and optionally others such as 'opening hours', in which the device can be used (if not set, the device can be available when the device is connected to the internet or to other networks).

In a further aspect, the invention relates to a computer-implemented method for composing a cutting form on a two-dimensional sheet for a three-dimensional construction, in which the cutting form is saved in a file format that is suitable for being uploaded to and/or being read by a device for cutting sheets of stiff material, such as (corrugated) cardboard and others. This cutting form can be composed in a (mobile) application on a mobile apparatus, such as described above.

Note that it is also possible to save the cutting forms externally, for example in the cloud, in which the device for cutting can connect to the cloud or the internet to open external files, or to upload them. Preferably, a user can create and upload such files to the device, and save them in a memory of the device, so that the cutting forms can be re-used. The files with cutting forms can be transferred from an apparatus to the device via internet, Bluetooth, via wired connection, via USB or other connections. Preferably, the files with cutting forms can be easily adjusted, for example on the device itself.

In a preferred embodiment, the above-mentioned computer-implemented method for composing a cutting form on a two-dimensional sheet for a three-dimensional construction uses a device for cutting sheets as described in the present document.

The advantages of the above method for composing cutting forms combined with a compact and easily controllable device for laser cutting will be clear, and have already been described in the advantages of the device itself. They can easily be installed in public rooms such as post offices without any inconvenience and can there create the necessary products tailored to the users, by means of a simple control that requires little prior knowledge of a user.

In a preferred embodiment, the beam direction is substantially perpendicular to the transport plane, preferably with a maximum deviation of 20° with respect to the perpendicular position to the transport plane, more preferably with a maximum deviation of 15° and still more preferably with a maximum deviation of 12°. In still more preferred embodiments, the deviation is maximum 11°, 10°, 9°, 8°, 7°, 6°, 5°, 4°, 3°, 2°, 1° or even 0°.

In a further aspect, the invention relates to a computer-implemented method for composing and executing a cutting pattern on a two-dimensional sheet for a three-dimensional construction based on dimensions of the three-dimensional construction and based on one or more predetermined cutting forms, comprising the following steps:

a. receiving the dimensions of the three-dimensional construction;
b. selecting a cutting form from the one or more predetermined cutting patterns;
c. composing the cutting pattern based on the dimensions and the selected cutting form;
d. optionally, choosing and/or setting a kind of material for the two-dimensional sheet and adjusting the cutting pattern based on the selected and/or set kind of material;
e. setting an instruction for a device for cutting a stiff material in the set cutting pattern.

The dimensions of the three-dimensional construction can for example be simply a length, width and height, but can also describe more complex forms, such as combinations of several solid figures (e.g. Truncated cone or a cube for packing a vase), for which dimensions and forms can then be set via a suitable program.

The advantages thereof have already been described in the present document, and comprise amongst other things the advantages of the device itself, that can be used simply and in a large number of circumstances and locations.

In a further embodiment, the method comprises a step in which one or more additional cutting patterns are cut in the stiff material, in which the additional cutting patterns are suitable for enveloping, after three-dimensional assemblage, subsequently the three-dimensional construction, or subsequently being enveloped by the three-dimensional construction, and in which the enveloping or the being enveloped takes place in a substantially tight-fitting way. Preferably, the cutting patterns are assembled in an already enveloped state to allow for a more close enveloped, than in case the previously separately assembled three-dimensional constructions have to be assembled afterwards (here more play or tolerance will be necessary). In this way, a kind of matryoshka construction is made, in which the constructions fit into each other, in a substantially tight-fitting way (thus as little space as possible between the construction, preferably almost none), so that they can substantially be considered as one box or construction with several layers as a wall, and hence an improved strength and resistance. Preferably, this method can optionally be indicated (for example, by ticking off or clicking). Preferably, the cutting patterns are executed so that the three-dimensional constructions are enveloped with a play of less than 1.0 cm, preferably less than 0.5 cm, more preferably less than 0.25 cm or even 0.2 cm or 0.1 cm, between the side walls of subsequent three-dimensional constructions. Most preferably, there is no play between the side walls of subsequent three-dimensional constructions. This allows to construct, in a simple way, boxes and other containers (or other elements) with a higher strength, without however having to give in new figures and dimensions. The method can automatically extrapolate new cutting patterns from previous cutting patterns and with knowledge of the thickness of the used stiff material.

In a further preferred embodiment, the computer-implemented method for composing and executing a cutting pattern on a two-dimensional sheet for a three-dimensional construction, is the device for cutting suitable for recognizing dimensions of the two-dimensional sheets, in which the device for cutting is adapted for receiving several instructions for cutting the predetermined cutting patterns, and in which the device for cutting automatically carries out the step of optimally combining the several instructions for cutting the predetermined cutting patterns based on the dimensions of the two-dimensional sheets, so that optimal use can be made of the two-dimensional sheets. This measure ensures a further saving of the number of sheets used. The combination of several cutting patterns on one single sheet can be optimized by means of specific algorithms.

In a further preferred embodiment, the above-mentioned computer-implemented method for composing and executing a cutting pattern on a two-dimensional sheet for a three-dimensional construction uses a device for cutting sheets in a stiff material such as (corrugated) cardboard as described in the present document.

In the following, the invention will be described by means of non-limiting examples illustrating the invention, and not meant to be interpreted as limiting the scope of the invention.

Example 1

Figure 2:
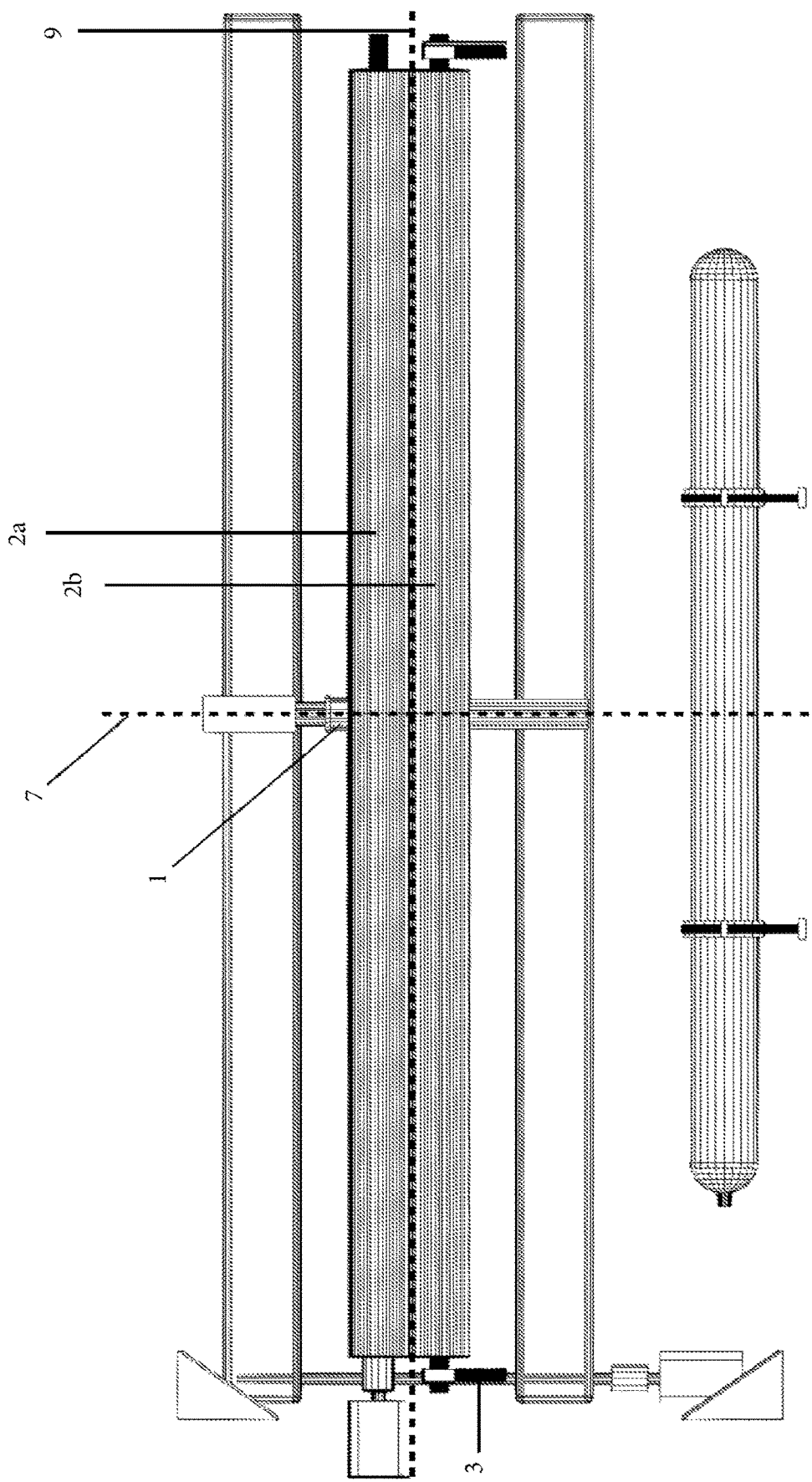
FIG. 2 shows a front view of the device along the transport direction.
Figure 8:
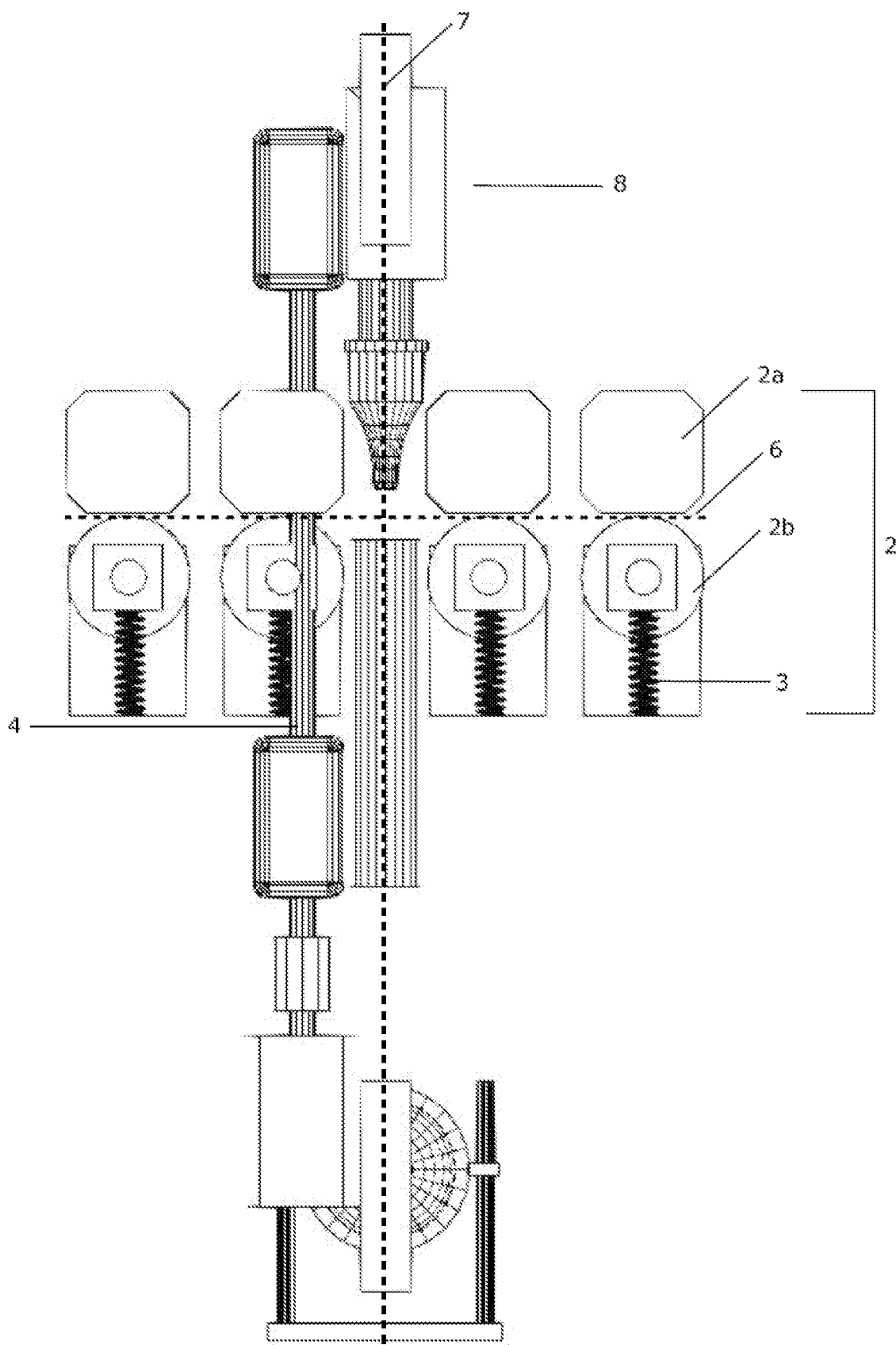
FIG. 8 shows a side view of the device perpendicular to the transport direction and along the transport plane.

In the figures (FIGS. 1, 2 and 8), cross-sections or views from different points of view are shown of a possible embodiment of the device, in simplified form. The mechanic connections between the separate systems can be provided in a large number of ways and are therefore not further discussed where not necessary. Here, the transport plane (6) is shown, of which the projection in FIG. 1 and FIG. 8 also coincides with the transport direction. The transport plane (6) is at both sides surrounded by a set of rollers (2a, 2b) in this case, that are together integrated in the transport system (2) (together with a control, for example a stepping motor). The transport system (2) can move sheets along the transport direction in both senses, thus for example in FIG. 1 from the left to the right. Here, it should be noted that the first set of rollers (2a) is mounted stationary with respect to the cutting system along the beam direction (or with respect to the transport plane). The second set of rollers (2b) can be moved along the direction perpendicular to the transport plane, so that sheets with varying thickness can be clamped between the rollers of the first set (2a) and the rollers of the second set (2b), that diverge further in case of thicker sheets (or thicker materials). In this embodiment, the rollers of the second set (2b) are mounted by means of spring components (3) with respect to a fixed support that is not shown in this configuration, but that can be simply provided. This fixed support is also a fixed reference for the cutting system (8), along which (components of) the cutting system (8) can only move along the cutting direction (9). Between the sets of rollers (2a, 2b), the sheets (or any types of material) are moved in order to be processed by the cutting system (8). The cutting system (8) comprises one or more optical systems and lasers (1). The optical systems are adapted to direct the laser beams of the lasers (1) along the beam direction (7) and to focus them on a sheet on the transport plane (6). The cutting system (8) is adapted so that the laser beams that extend along the beam direction (7), can be moved over the cutting direction (9) in order to be able to cut over the width of the transport plane (6). In this embodiment, the laser (1) itself is mounted movably over the cutting direction (9), in other possible embodiments, the laser is mounted stationary and shifts (a part of) the optical system along the cutting direction (9) that direct and/or focuses the beam of the laser to a sheet on the transport plane (6).

In a further embodiment, a suction system can be present, that is advantageously mounted so that it is located at least partially (or at least with its mount) between the lasers and/or optical systems and the transport plane (6).

Example 2

In a next example, the so-called matryoshka system is proposed, in which several boxes (or other objects, boxes are only used here as an object that is easy to visualize) are fabricated that are suitable to fit Into each other, and as such to serve as a single reinforced box. As such, a cardboard plate of 4 mm thick can be used as a first box and a second box, of which the desired dimensions have already been given in (of for which even a cutting pattern has been given in). By checking off a "matryoshka" option, an instruction is automatically given to the device to execute a second cutting pattern for the second box that is suitable after assemblage for enveloping the first assembled cutting pattern. Alternatively, a second cutting pattern can be executed that is suitable after assemblage for being enveloped in the first assembled cutting pattern. This can be done simply be adjusting the dimensions of the cutting pattern (increasing or decreasing, dependent on the fact whether it should envelope or be enveloped) with a margin of 4 mm (or 8 mm dependent on the respective dimension), so that the assembled cutting patterns closely fit.

Example 3

Figure 9:
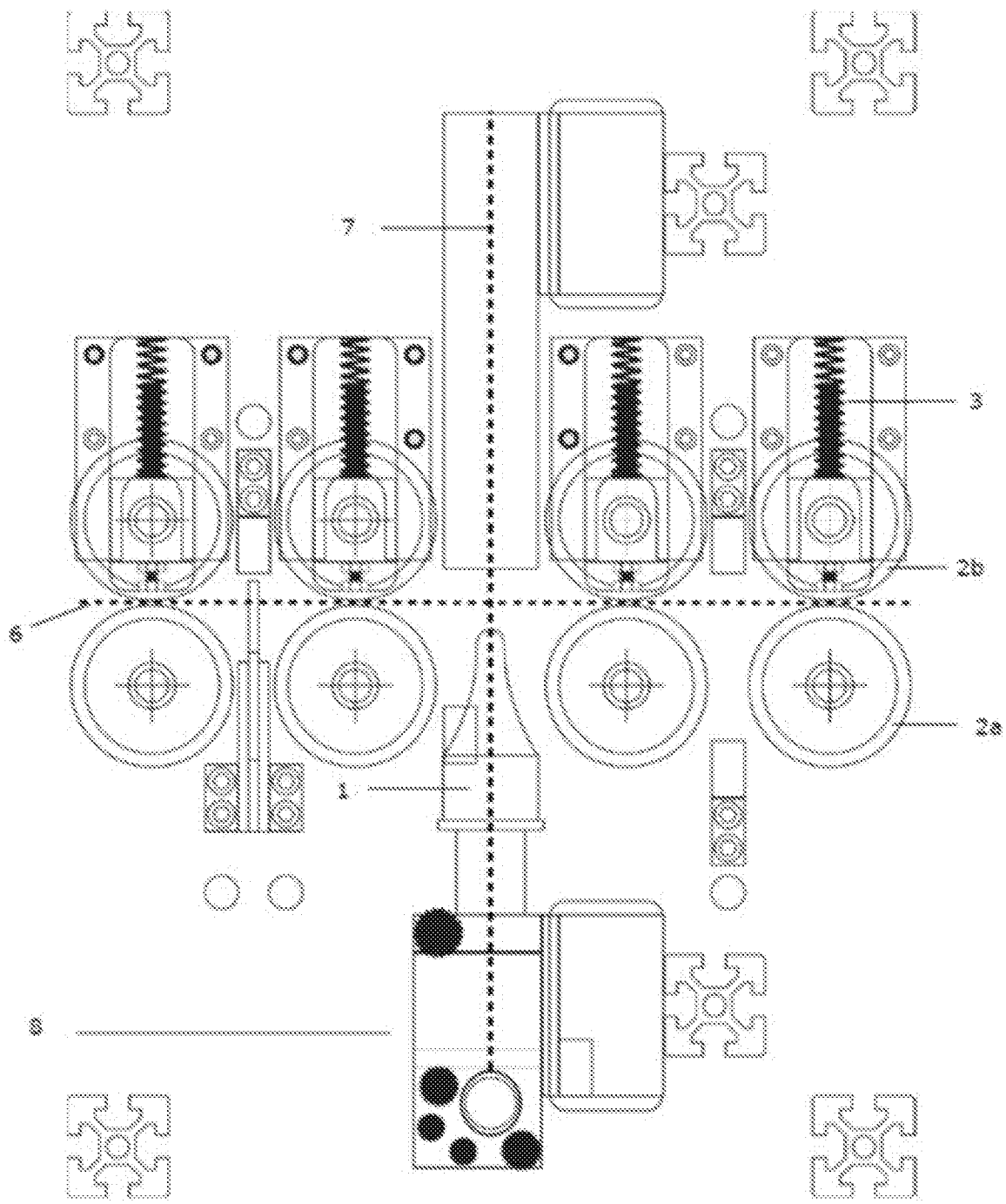
FIG. 9 shows a cross-section of the device for cutting sheets of a stiff material according to a preferred embodiment, perpendicular to the transport direction and along the transport plane.

In a specific configuration of a preferred embodiment shown in FIG. 9, both the gripping elements (2a) that are positioned stationary with respect to the laser head (1) itself (and/or the optical system that manipulates the laser beam), and the laser head (1) (and optical systems) are both located under the transport plane (6) at the device in an operative state. The above gripping element (2b), in this specific example for example, but not limited to, rollers, can for example ensure the gripping by clamping via spring component (3). Alternatively, this clamping can also be carried out simply under the influence of the gravity on the above gripping elements (2b), as a result of which the sheets between the stationary gripping elements (2a) and the movable (2b) gripping elements are gripped by clamping them. The laser head (1) and optical systems are hereby also positioned under the transport plane (6) to ensure that the distance between the laser head (1) and/or the optical system (and in this case in the form of lenses can be built into the laser) on the one hand, and the closest side of the sheets that are processed on the other side, remains substantially constant.

Example 4

Figure 3:
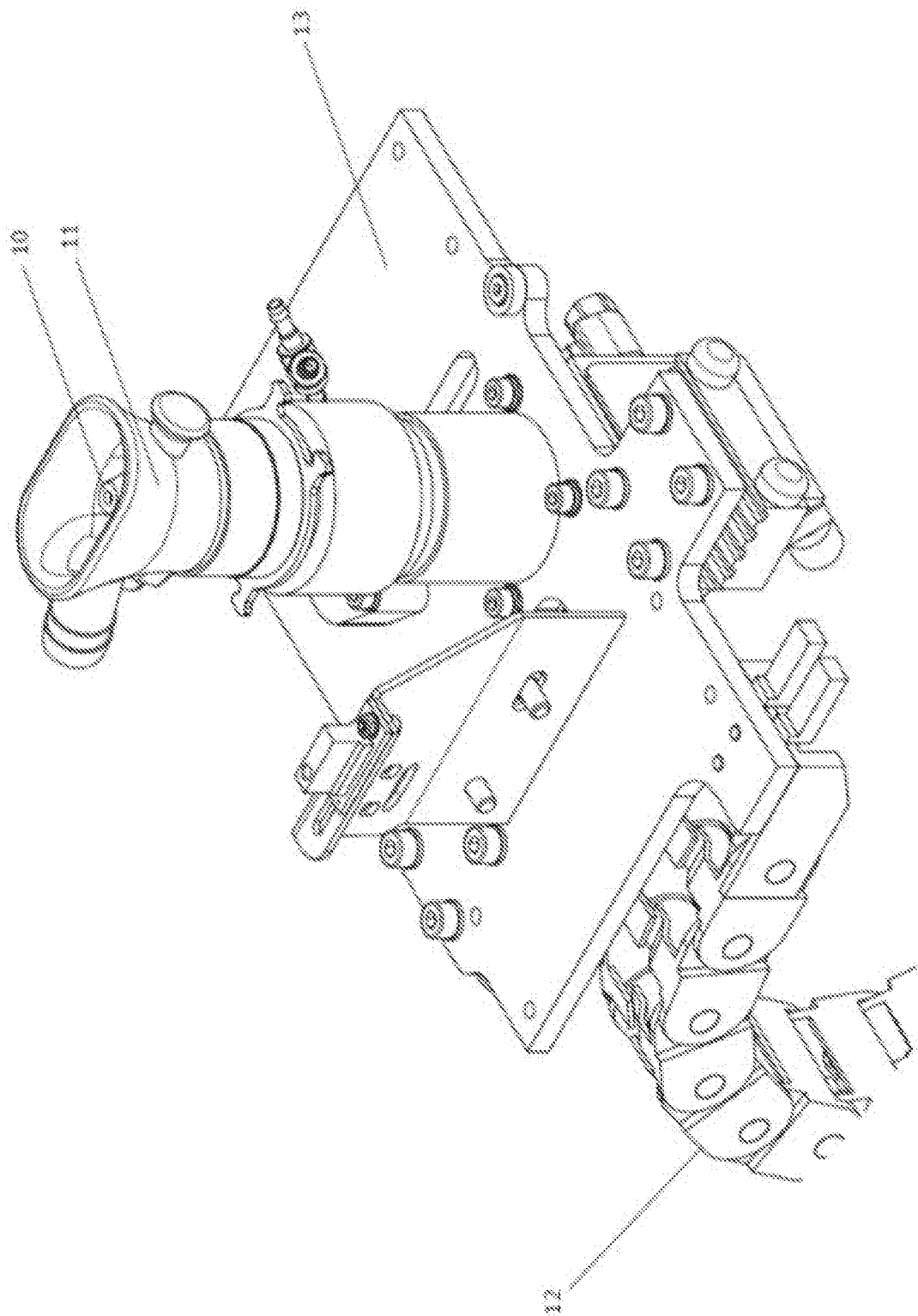
FIG. 3 shows a perspective view of a possible embodiment of the optical system (laser head) and a part of a device for moving it along the cutting direction.
Figure 7:
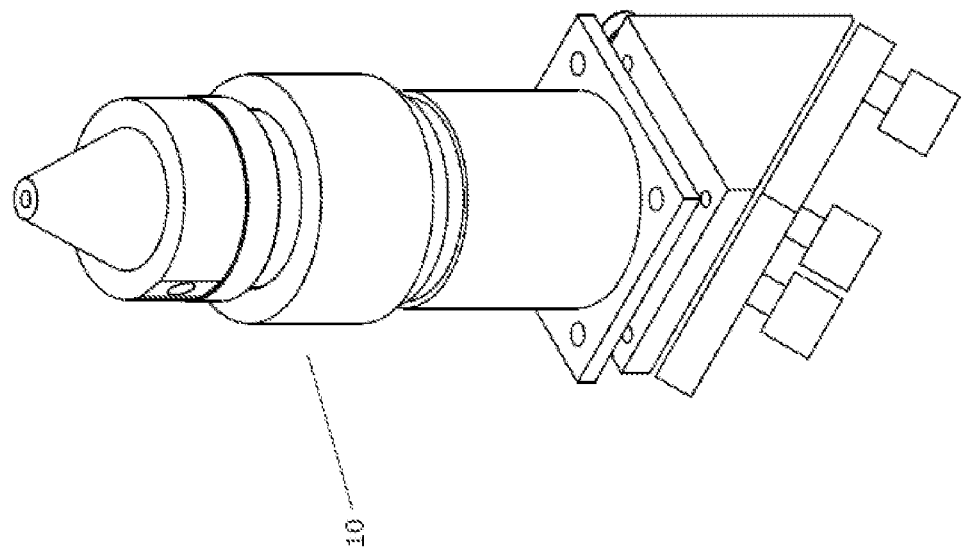
FIG. 7 shows a possible embodiment of a beam head as part of the optical system for the invention.
Figure 7:
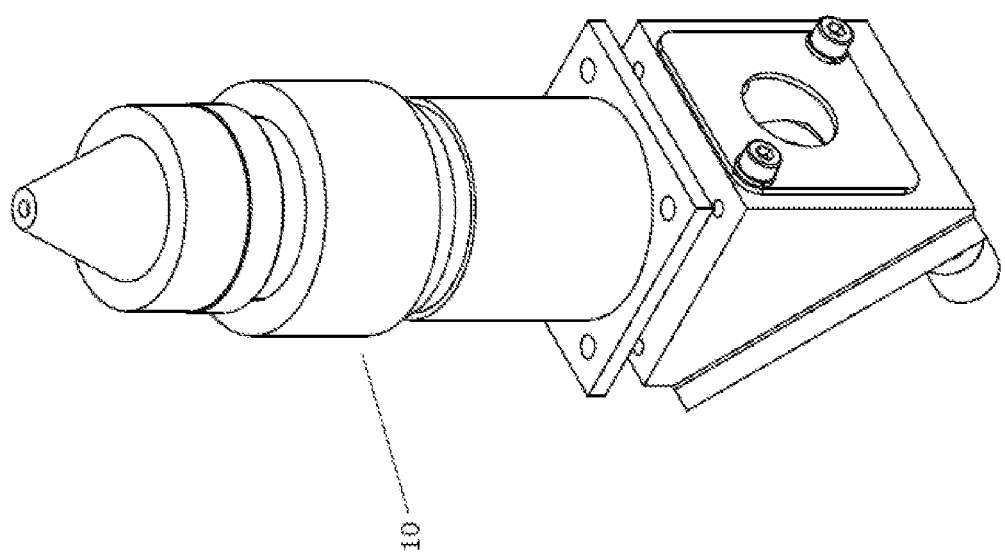

FIG. 3 shows a specific configuration of a movable optical system or laser head (10), suitable for directing the laser beam, in which it can be moved along the cutting direction by means of a motor, or other driving mean, that moves the platform (1) with the optical system (10), and that is cabled via an energy chain or cable caterpillar (12). Hereby, a partially enclosing cap (11) can also be seen around the laser head (10) suitable for suction (and/or blowing away) of smoke, dust and heath away from the laser head (10). Note that in further embodiments, there are possibilities to mount the beam movably, so that the laser beam can be provided in a non-perpendicular angle with respect to the transport plane. As such, the laser head (10) can be tilted, in which it can be placed in an angle, preferably in a plane parallel to the transport direction and a perpendicular line to the transport plane. Alternatively or additionally, the laser head (10) can also be tilted in a plane parallel to the cutting direction and a perpendicular line to the transport plane. As said, the angle that the produced laser beam make with the perpendicular line on the transport plane is preferably maximum 20°, more preferably maximum 15° or even 12° or less. FIG. 7 finally shows a possible embodiment for a beam head suitable for directing the laser beam in a device or method according to the invention.

Example 5

Figure 4:
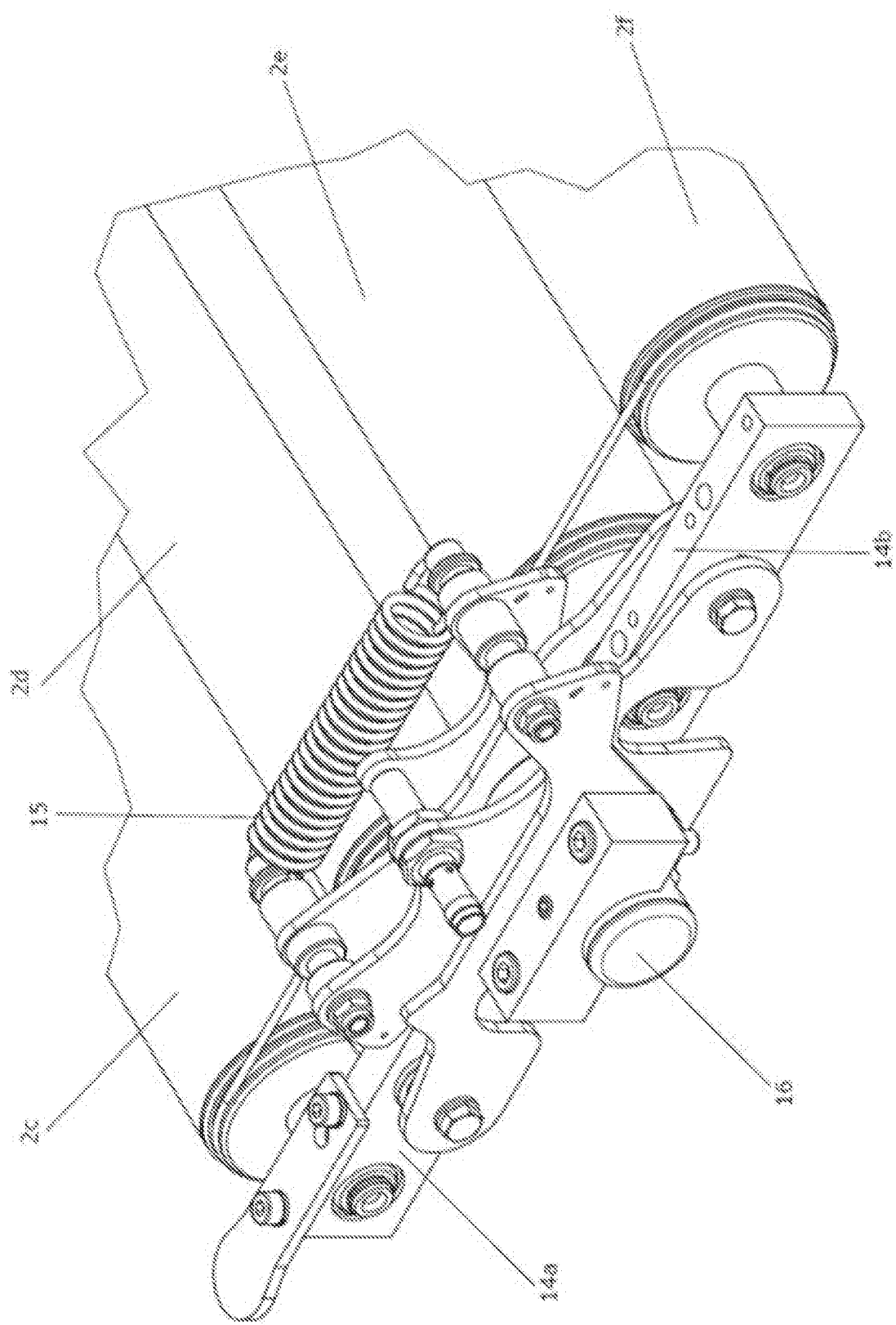
FIGS. 4 and 5 show a perspective view of both ends of a possible embodiment for a set of rollers of the transport system according to the invention, specifically the movable set of rollers.
Figure 5:
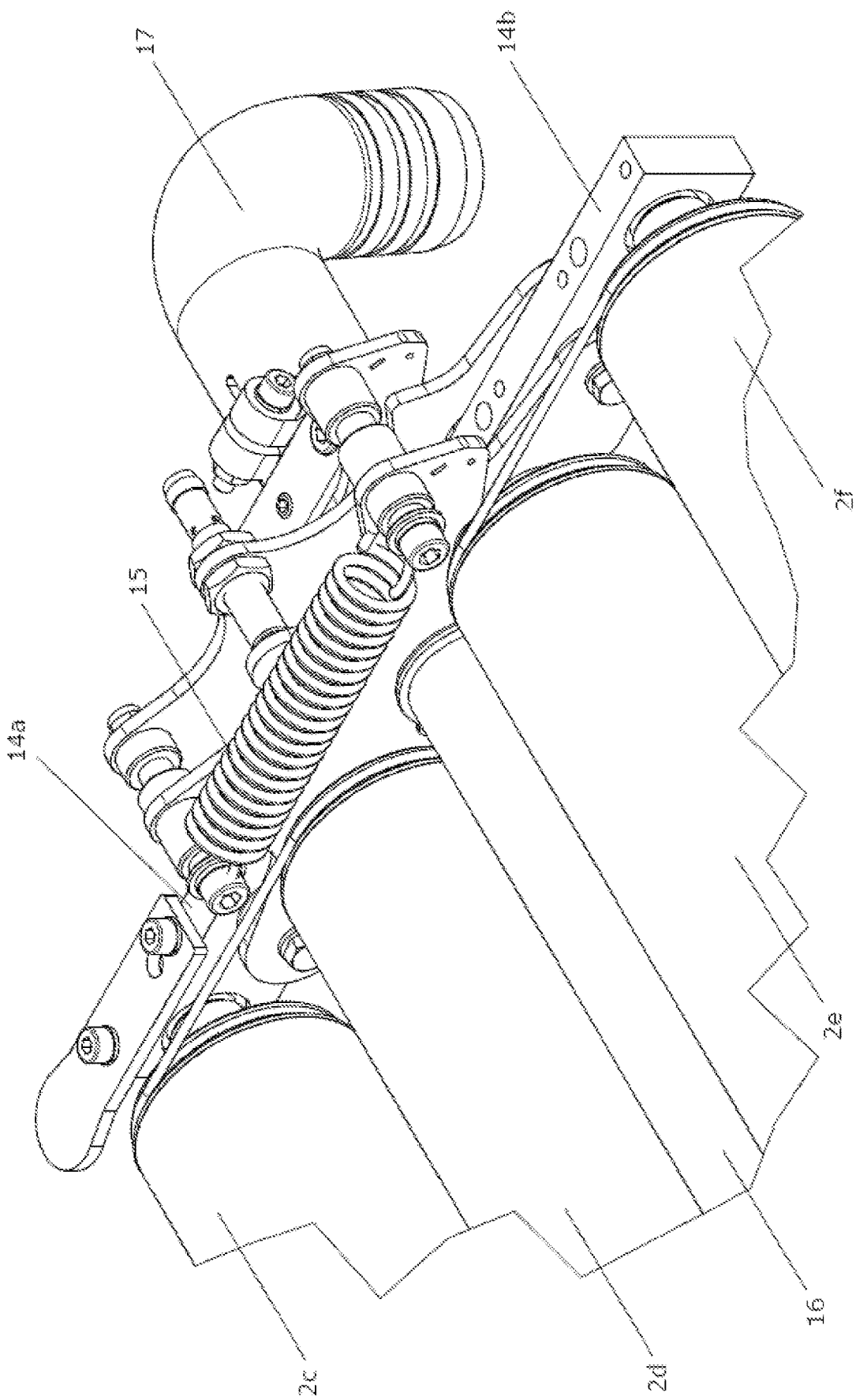
Figure 6:
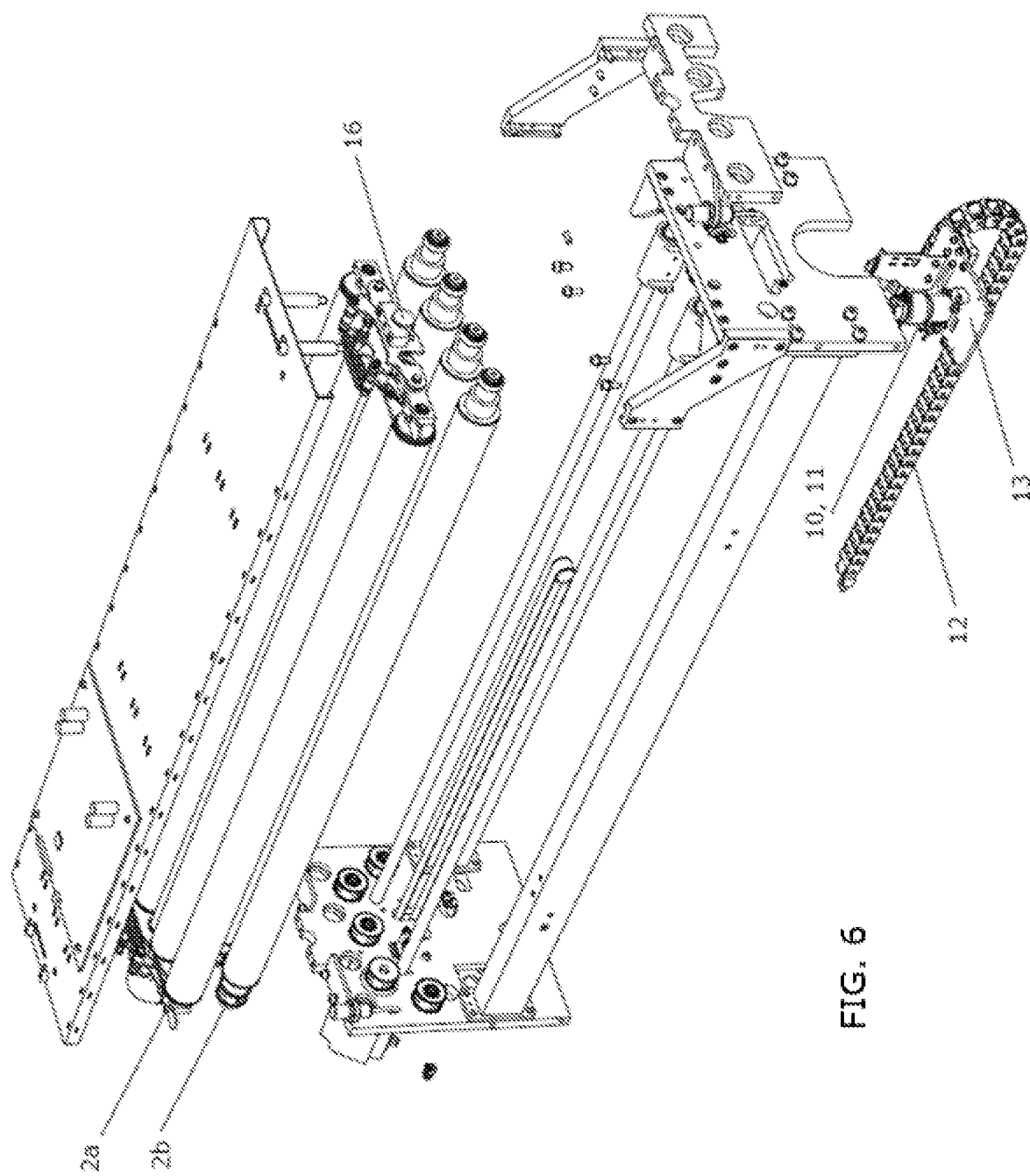
FIG. 6 shows an exploded view of a possible embodiment of a part of the device according to the invention.

FIGS. 4 and 5 show a possible construction for a set of rolls. Specifically, the suggested embodiment is extremely suitable as a movable set of rolls (preferably the upper set in the most preferred embodiment in which the laser beam cuts from below in the sheets), considering the flexible positioning possibilities thereof. Because the set of rolls can be pushed against the sheets, they will automatically follow the relief of the sheets, as they can mutually be pivoted to some extent. As such, the rolls of the two roll pairs (2c, 2d and 2e, 2f) per roll pair can be pivoted with respect to each other, via the roll connections (14a, 14b) (central connection point of the roll connections with a suspension structure shown around which they can be pivoted). Note that the roll connections (14a, 14b) are not connected rigidly to each other. However, there is also a cross-connection (via the suspension structure) that connects the roll pairs (2c, 2d and 2e, 2f). This cross-connection is further provided with a spring (15) as a power transmission so that in this way, the roll pairs push each other against the sheets to process, all the more as one of the roll pairs diverges further from the transport plane (for example because of the relief of the sheets). Finally, there is also a protection element (16), that is a cylindrical object that extends centrally between the rolls, and is positioned so that a laser beam that cuts a sheet, is directed thereto. This protection element (16) is suitable for essentially absorbing the broken-through laser beam and removing the produced heath (typically through a hollow inside of the protection element, possibly provided with a ventilation system that ensures the air passage, moreover openings can be provided over the length of the protection element to further remove warm air, smoke or dust). Also, a discharge (17) can be provided at an end of the protection element (16) to remove heath (and/or dust, smoke, . . . ) via a generated air stream through the protection element (16).

It will be understood that the present invention is not limited to the embodiments described above and that some adjustments or changes can be added to the described examples without changing the scope of the enclosed claims. The present invention has for example been described with reference to the cutting of sheets of a stiff material, such as cardboard and others, for making packages, but it will be clear that the invention can also be used for e.g. processing, perforating, engraving or etching cardboard or others, for other purposes and/or can be applied to other types of basic materials, such as boards, plates and others, or other kinds of material, for example paper, wood, metal, carbon, glass, plastic and others.

The invention claimed is:

1. A device for cutting sheets of a stiff material, comprising:
    a transporter for the controlled movement of the sheets along a transport direction from an input to an output, in which the sheets lie in a transport plane that is parallel to the transport direction, wherein the transporter is adapted to move the sheets in a controlled way within the transport plane;
    a cutter for processing the sheets, the cutter comprising at least one laser for producing at least one laser beam and comprises at least one optical controller for controlling the at least one laser beam so that at least a part of the at least one laser beam cuts the transport plane along a beam direction, in which the at least one optical controller is adapted to move at least a portion of the at least one laser along a cutting direction such that the at least one laser beam cuts the transport plane, the at least one optical system being configured to move along an axis to move the at least one laser beam along the cutting direction, the axis along which the at least one optical system is configured to move being perpendicular to the transport direction and is parallel to the transport plane and the cutting direction;
    wherein the transporter is adapted for gripping the sheets during movement at at least two grip zones by clamping the sheets at said grip zones to limit variation on the position of the sheets with respect to the cutter along the beam direction, wherein the beam direction is substantially perpendicular to the transport plane,
    wherein the transporter comprises at least two grippers on each side of the transport plane, the at least two grippers on each side of the transport plane being spaced apart from one another such that the at least one laser beam can pass therebetween, the grippers being suitable for gripping the sheets by clamping the sheets at both sides of the transport plane in the grip zones and for moving the sheets in a controlled way along the transport direction, and in which the grippers at a first side of the transport plane where the at least a portion of the at least one laser is located, are positioned at a fixed distance with respect to the axis over which the at least one optical controller moves, wherein the grippers at the second side of the transport plane are movably positioned to grip the sheets by clamping them, wherein the grippers at the second side of the transport plane are configured to passively move in a direction perpendicular to the transport plane; and
    wherein the grippers at the second side of the transport plane are connected to one another by two roll connections, a cross-connection, and a spring, wherein the roll connections, cross-connection, and spring cooperate to press both of the grippers at the second side of the transport plane against the sheets.

2. The device of claim 1, wherein the transporter comprises a roller system, in which the roller system comprises a first set of rollers and a second set of rollers, so that the first set of rollers and the second set of rollers can grip the sheets by clamping them between the first set of rollers and the second set of rollers and can move the clamped sheets along the transport direction, and within the transport plane.

3. The device of claim 1, wherein the device comprises a controller for controlling the transporter and the cutter, in which the controller is adapted to select instructions from one or more instructions for one or more cutting forms on the sheets so that, based on the length and width of the sheets, waste of the sheets is limited.

4. The device of claim 1, wherein the at least one optical controller comprises one or more mirrors configured for manipulating the at least one laser beam, wherein the at least one laser beam is deflected at least partially so that the at least one deflected laser beam intersects the transport plane along the beam direction.

5. The device of claim 4, wherein at least one of the mirrors are mounted movably along the cutting direction with respect to the transporter so that the at least one deflected laser beam can be moved along the cutting direction, and whereby the at least one deflected laser beam does not change direction.

6. The device of claim 1, in which the cutter and the transporter are adjusted to each other so that the processing of the sheets according to a predetermined design is carried out by moving the sheets along the transport direction and moving the at least a portion of the at least one laser such that the at least one laser beam intersects the transport plane along the cutting direction, wherein the moving of the at least a portion of the at least one laser is actuated by the moving of the at least one optical controller along the cutting direction.

7. The device of claim 2, wherein the first set of rollers comprises at least two groups of rollers in which the at least two groups of rollers of the first set are separated from each other along the transport direction so that the at least one laser beam that intersects the transport plane between the separated groups of rollers of the first set can move along the cutting direction and in which the second set of rollers comprises at least two groups of rollers in which the at least two groups of rollers of the second set are separated from each other along the transport direction so that the at least one laser beam that intersects the transport plane between the separated groups of rollers of the second set can move along the cutting direction.

8. The device of claim 1, wherein the device is adapted for being mounted so that the transport plane is substantially parallel to a base onto which the device is placed during operation of the device.

9. The device of claim 1, wherein the device is adapted for being mounted so that the transport plane is at an angle to a base onto which the device is placed during operation of the device.

10. The device of claim 1, wherein the device comprises a supporting surface for at least partially supporting the sheets, wherein the supporting surface can be folded out at least at one side of the device, and wherein the supporting surface can be folded out at the input and at the output of the device.

11. The device of claim 1, wherein the transport plane separates two half-spaces, in which the first set of rollers is located in the first separated half-space, and the second set of rollers is located in a second separated half-space, wherein the second half-space is different from the first half-space, and the first set of rollers is located between the transport plane and the at least one laser, and in which the first set of rollers can be moved to and from the second set of rollers.

12. The device of claim 11, wherein the second set of rollers is adapted such that the second set of rollers can be moved with respect to the cutter along the beam direction, and in which the first set of rollers is mounted stationary with respect to the cutter so that the second set of rollers can grip the sheets by clamping the sheets against the stationary first set of rollers, and in which the cutter processes the sheets from the first half-space, so that substantially the same distance along the beam direction is maintained between the at least one laser and the clamped sheets.

13. The device of claim 1, wherein the beam direction is substantially perpendicular to the transport plane with at most a deviation of 20° with respect to a perpendicular position to the transport plane.

14. A method for cutting sheets of a stiff material, comprising the following steps:
moving at least one sheet of the stiff material in a controlled way along a transport direction, in which the sheet lies in a transport plane that is substantially parallel to the transport direction; and
moving at least a portion of at least one controllable laser in a controlled way along an axis and in a cutting direction, such that at least one laser beam from the at least one controllable laser intersects the transport plane along a beam direction, in which the cutting direction is parallel to the transport plane, and in which the at least one laser beam is configured for processing the at least one sheet and for cutting the at least one sheet, and the cutting direction being substantially perpendicular to the transport direction;
wherein the at least one laser beam executes at least one cut of the at least one sheet when moving the at least one laser along the cutting direction;
wherein the controlled movement of the at least one sheet is carried out whereby the sheet undergoes limited variation in position along a direction along the beam direction; and
wherein the at least one sheet is gripped by at least two grippers on each side of the transport plane by clamping the sheets during the controlled movement of the at least one sheet, in which the grippers on the side of the at least one sheet where the at least one laser beam falls onto, are positioned stationary with respect to the axis over which the at least a portion of at least one controllable laser can be moved, and the grippers at a second side of the transport plane opposite the first side are configured to passively move in a direction perpendicular to the transport plane; and
wherein the grippers at the second side of the transport plane are connected to one another by two roll connections, a cross-connection, and a spring, wherein the roll connections, cross-connection, and spring cooperate to press both of the grippers at the second side of the transport plane against the sheets.

15. The method for cutting sheets of claim 14, wherein the at least one laser beam is generated and guided by at least one laser and at least one optical controller, wherein at least a portion of the at least one controllable laser and the optical controller are mounted movably along the cutting direction.

16. The method of claim 14, in which the at least one laser beam is processed by at least one optical controller so that the at least one laser beam intersects the transport plane, wherein the at least one optical controller is mounted movably along the beam direction so that when executing the cut, a constant, predetermined distance along the beam direction is maintained to a closest side of the at least one sheet.

17. The method of claim 14, in which the beam direction is substantially perpendicular to the transport plane, with at most a deviation of 20° with respect to a perpendicular position to the transport plane.

18. The method of claim 14, in which the sheets are formed of at least one of the group consisting of cardboard, corrugated cardboard and combinations thereof.

19. The method of claim 14, wherein the method is computer-implemented for composing and executing a cutting pattern on a two-dimensional sheet of stiff material for a three-dimensional construction based on dimensions of the three-dimensional construction and based on one or more predetermined cutting forms, wherein the method comprises the following steps:
- receiving the dimensions of the three-dimensional construction;
- selecting a cutting form from the one or more predetermined cutting patterns;
- composing the cutting pattern based on the dimensions and the selected cutting form; and
- sending an instruction to a device for cutting the stiff material into the composed cutting pattern.

20. The method of claim 19, wherein at least one additional cutting pattern is cut in a sheet of stiff material, wherein the additional cutting pattern is suitable for enveloping, after three-dimensional assemblage, the three-dimensional construct, or being enveloped by the three-dimensional construct, in a tight fitting manner.

21. The method of claim 19, wherein the device for cutting is configured for determining dimensions of the at least one sheet, for receiving the instruction for cutting the composed cutting pattern, and for cutting the composed cutting pattern to limit waste.

\* \* \* \* \*